(12) United States Patent
Nishi (10) Patent No.: US 10,348,863 B2
(45) Date of Patent: Jul. 9, 2019

(54) IMAGE FORMING SYSTEM WITH BEACON TECHNOLOGY

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Kouichirou Nishi, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 15/455,434

(22) Filed: Mar. 10, 2017

(65) Prior Publication Data

US 2018/0027094 A1    Jan. 25, 2018

(30) Foreign Application Priority Data

Jul. 19, 2016   (JP) .................................. 2016-141735

(51) Int. Cl.
| | |
|---|---|
| H04L 29/06 | (2006.01) |
| H04W 76/11 | (2018.01) |
| H04L 29/08 | (2006.01) |
| H04M 1/725 | (2006.01) |
| G01S 1/00 | (2006.01) |
| G01S 5/00 | (2006.01) |
| G01S 5/14 | (2006.01) |
| H04N 1/00 | (2006.01) |

(52) U.S. Cl.
CPC ............. *H04L 67/42* (2013.01); *G01S 1/00* (2013.01); *G01S 5/0036* (2013.01); *G01S 5/14* (2013.01); *H04L 67/18* (2013.01); *H04M 1/7253* (2013.01); *H04M 1/72583* (2013.01); *H04N 1/00* (2013.01); *H04W 76/11* (2018.02); *H04M 1/72572* (2013.01)

(58) Field of Classification Search
None
See application file for complete search history.

(56) References Cited

U.S. PATENT DOCUMENTS

| | | | |
|---|---|---|---|
| 8,982,389 B2 | 3/2015 | Sasaki | |
| 2013/0329253 A1* | 12/2013 | Sasaki | H04N 1/0035 358/1.15 |
| 2014/0211252 A1* | 7/2014 | Tsujimoto | H04W 4/80 358/1.15 |

* cited by examiner

*Primary Examiner* — Andrew H Lam
(74) *Attorney, Agent, or Firm* — Amin, Turocy & Watson LLP (57) ABSTRACT

In accordance with an embodiment, a beacon utilization system comprises an image forming apparatus, a server and a mobile terminal. The image forming apparatus wirelessly transmits a beacon including identification information, and sends a status to the server. The server receives the identification information from the mobile terminal, and sends map information for displaying the image forming apparatus specified by the identification information to the mobile terminal. The mobile terminal receives the beacon, sends the identification information to the server, receives the map information from the server, and displays a map screen for displaying the status of the image forming apparatus indicating a position of the image forming apparatus on the basis of the map information.

20 Claims, 5 Drawing Sheets

IMAGE FORMING SYSTEM WITH BEACON TECHNOLOGY

CROSS-REFERENCE TO RELATED APPLICATIONS

This application is based upon and claims the benefit of priority from Japanese Patent Application No. 2016-141735, filed Jul. 19, 2016, the entire contents of which are incorporated herein by reference.

FIELD

Embodiments described herein relate generally to a utilization of a beacon technology in relation to an image forming apparatus.

BACKGROUND

In recent years, utilization of a beacon serving as a radio signal is being promoted. A typical reception distance of the beacon from a transmitter is a few tens of meters. There is a system that puts a transmitter of a beacon in a store. In the system, if a customer comes to the store, a mobile terminal of the customer receives the beacon. Thereupon, the mobile terminal automatically receives a coupon of the store from a server, and thus, the user can easily get the coupon of the store and use the coupon.

An image forming apparatus such as an MFP (Multi-Function Peripheral) is known (for example, see Japanese Unexamined Patent Application Publication No. 2012-226350). There is a case in which a plurality of the image forming apparatuses such as the MFPs is arranged at one floor or in a certain locale (such as a copy room) in a company and the like. Therefore, there is a demand for the user to select which device to use after grasping a status such as electric power and a job and the like of each of surrounding apparatuses.

DETAILED DESCRIPTION

In accordance with an embodiment, a beacon utilization system comprises an image forming apparatus, a server and a mobile terminal. The image forming apparatus wirelessly transmits a beacon including identification information, and sends a status to the server. The server receives the identification information from the mobile terminal, and sends map information for displaying the image forming apparatus specified by the identification information to the mobile terminal. The mobile terminal receives the beacon, sends the identification information to the server, receives the map information from the server, and displays a map screen for displaying the status of the image forming apparatus indicating a position of the image forming apparatus on the basis of the map information.

In accordance with an embodiment, a beacon utilization system comprises an image forming apparatus, a server and a mobile terminal. The image forming apparatus wirelessly transmits a beacon including first identification information and sends a status to the server. The mobile terminal receives the beacon and sends the first identification information and second identification information of a user to the server. The server stores a job of the user, receives the first identification information and the second identification information from the mobile terminal, and sends the job of the user specified by the second identification information to the image forming apparatus specified by the first identification information.

In accordance with an embodiment, a method by a mobile terminal involves receiving a beacon transmitted by an image forming apparatus; sending identification information of the image forming apparatus included in the beacon to a server; receiving map information from the server; and displaying a map screen for displaying a status of the image forming apparatus indicating a position of the image forming apparatus on the basis of the map information.

In accordance with an embodiment, a beacon utilization method by a system which comprises an image forming apparatus, a server and a mobile terminal involves wirelessly transmitting a beacon including identification information, and sending a status to the server by the image forming apparatus; receiving the identification information from the mobile terminal, and sending map information for displaying the image forming apparatus specified by the identification information to the mobile terminal by the server; and receiving the beacon, sending the identification information to the server, receiving the map information from the server, and displaying a map screen for displaying the status of the image forming apparatus indicating a position of the image forming apparatus on the basis of the map information by the mobile terminal.

Hereinafter, each embodiment is described with reference to the accompanying drawings.

First Embodiment

Figure 1:
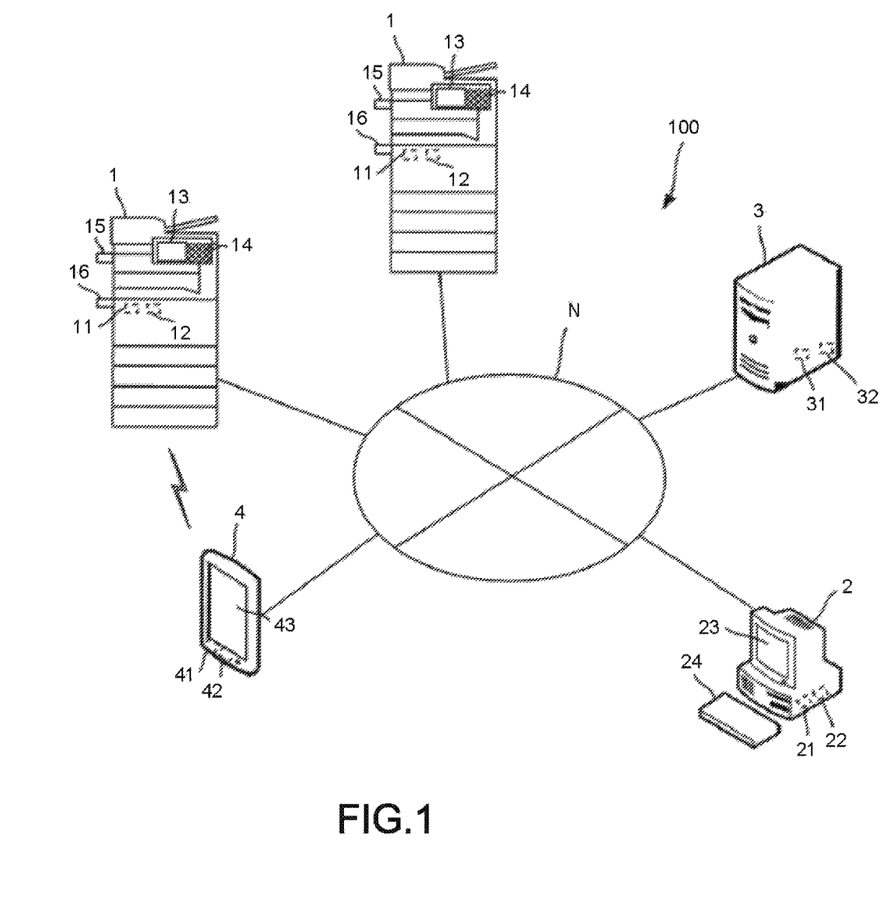
FIG. 1 is a diagram illustrating the constitution of a beacon utilization system.

FIG. 1 is a diagram illustrating the constitution of a beacon utilization system 100. The beacon utilization system 100 is equipped with an image forming apparatus 1, a terminal device 2, a server 3 and a mobile terminal 4. All the elements 1-4 are connected via a network N and can mutually carry out communication.

The image forming apparatus 1 is an MFP including a plurality of functions such as print, scan and the like. A plurality of the image forming apparatuses 1 is connected to the network N. The image forming apparatus 1 is equipped with a processor 11, a memory 12, a display 13, an operation section 14, a card reader 15 and a transmitter 16. The operation section 14 which includes buttons and a touch panel receives an operation of a user. The card reader 15 reads an ID (Identification) card to acquire identification information of the user. The transmitter 16 periodically transmits a beacon including unique identification information of the image forming apparatus 1. The beacon is a radio signal based on a standard, for example, a BLE (Bluetooth Low Energy). Bluetooth is a registered trademark. The unique identification information of the image forming apparatus 1 is, for example, a MAC (Media Access Control address) address.

The image forming apparatus 1 regularly notifies the server 3 of the identification information, a status and an option item to be installed of the image forming apparatus 1. The status includes a status of a job, a status of electric power, presence/absence of an error status, a residual quantity of toner, a residual quantity of papers and the like. The status of the job refers to the number of uncompleted jobs that the image forming apparatus 1 has and whether each job is being held or being executed. The status of the electric power refers to power-ON or power-OFF of the power supply of the image forming apparatus 1 and the current mode (sleep mode and ready mode) relating to electric power. The error status refers to a case in which there is no sheet in a cassette, sheet jam and a case in which toner becomes empty. The image forming apparatus 1 detects an option item to be installed. The option item is, for example, a finisher including a stapling function and a bookbinding function and a hole punch including a hole punching function.

The terminal device 2 which is a PC (Personal Computer) is equipped with a processor 21, a memory 22, a display 23 and an operation section 24. The operation section 24 which is a keyboard or a mouse receives an operation of a user. The terminal device 2 receives an input of identification information of a user such as a password and a login name from the user. The terminal device 2 sends the identification information of the user to the server 3, and requests the server 3 to carry out authentication of the user. The terminal device 2 receives the operation of the user if it is determined that the user is adaptable.

The server 3 is equipped with a processor 31 and a memory 32. The server 3 carries out the authentication of the user if the authentication of the user is requested from each of the terminals 1, 2 and 4, and returns an authentication result to each of the terminals 1, 2 and 4. The server 3 stores the status and the option item received from each image forming apparatus 1 in the memory 32 in association with the identification information of each image forming apparatus 1. Furthermore, the memory 32 may store the option item in advance in association with the identification information of each image forming apparatus 1. The server 3 holds map information in which a position of each image forming apparatus 1 is regulated in advance.

In the beacon utilization system 100, it is possible for an image forming apparatus 1 desired by the user to carry out printing, that is, network printing. In the network printing, firstly, the terminal device 2 generates a print job through an operation of the user who receives the authentication, and sends the print job together with the identification information of the user to the server 3. The server 3 stores the print job received from the terminal device 2 in the memory 32 in association with the identification information of the user. The image forming apparatus 1 receives print jobs of the user from the server 3 after carrying out the authentication of the user, and displays the print jobs as a list. The image forming apparatus 1 carries out the print job selected by the user.

The mobile terminal 4 is equipped with a processor 41, a memory 42 and a touch panel 43 (display and operation section). The mobile terminal 4 includes an application for using a beacon transmitted by the image forming apparatus 1. The application receives an input of the identification information of the user such as the password and the login name from the user. The application sends the identification information of the user to the server 3, and requests the server 3 to carry out the authentication of the user. The application is possible to use various functions if it is determined that the user is adaptable. The mobile terminal 4 receives the beacon transmitted by the image forming apparatus 1.

Figure 2:
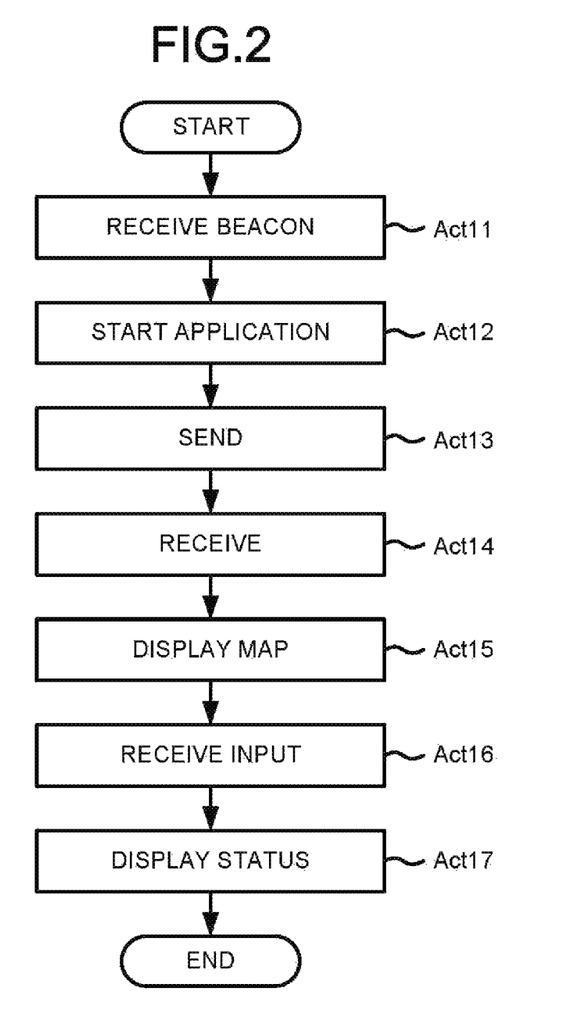
FIG. 2 is a flowchart illustrating a processing of a mobile terminal.

Hereinafter, a processing of the mobile terminal 4 at the time the user carries out the network printing with reference to a flowchart in FIG. 2. The processors 11, 21, 31 and 41 of the image forming apparatus 1, the terminal device 2, the server 3 and the mobile terminal 4 execute programs in the memories 12, 22, 32 and 42 to carry out each following processing.

The user sends the print job from the terminal device 2 to the server 3 in order to carry out the network printing. The user carries the mobile terminal 4 at a floor at which the image forming apparatus 1 is located in order to carry out the printing. The mobile terminal 4 carries out the authentication of the user to determine that the user is adaptable.

The mobile terminal 4 automatically starts the application (Act 12) if receiving the beacon transmitted by the image forming apparatus 1 (Act 11).

The application (mobile terminal 4) sends the identification information (first identification information) of the image forming apparatus 1 included in the received beacon and the identification information (second identification information) of the user to the server 3 (Act 13). The server 3 sends the map information for displaying the image forming apparatus 1 specified by the identification information to the mobile terminal 4. In the present embodiment, there is a plurality of image forming apparatuses 1 around the image forming apparatus 1 specified by the identification information. The server 3 sends the map information including the image forming apparatus 1 specified by the identification information and the image forming apparatuses 1 around the specified image forming apparatus 1 to the mobile terminal 4. Further, the server 3 sends the statuses and the option items of the image forming apparatus 1 specified by the identification information and each image forming apparatus 1 around the specified image forming apparatus 1 to the mobile terminal 4.

The application receives the map information and the status and the option item of each image forming apparatus 1 from the server 3 (Act 14).

Figure 3:
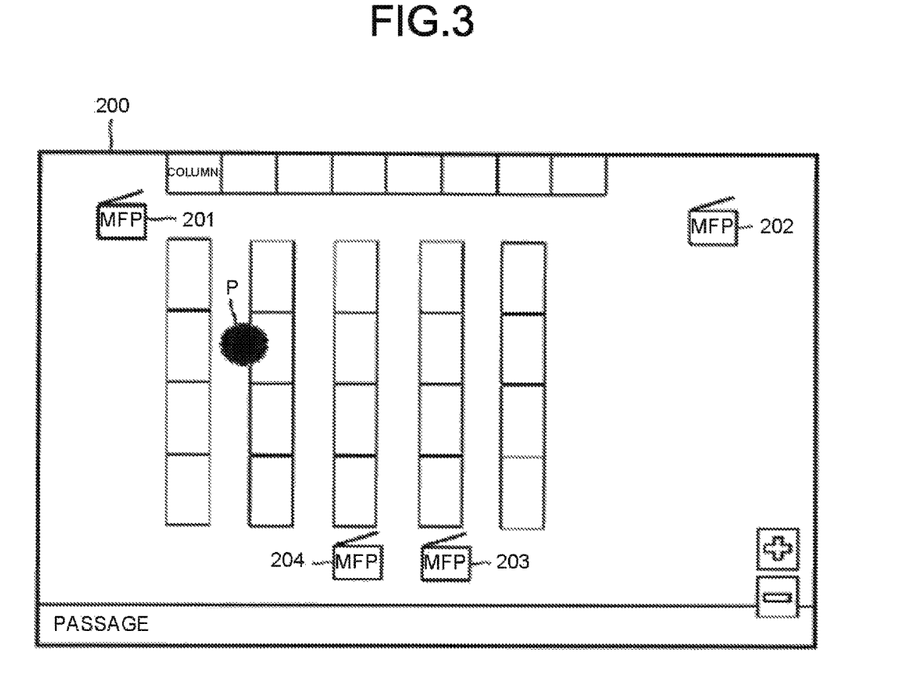
FIG. 3 is a diagram illustrating a map screen.

FIG. 3 is a diagram illustrating a map screen 200.

The application displays the map screen 200 for displaying the status of the image forming apparatus 1 which is a map screen indicating a position of the image forming apparatus 1 specified by the identification information included in the received beacon (Act 15). The application displays a map of surroundings of the image forming apparatus 1 specified by the received beacon on the map screen 200. The application displays an icon 201 of the image forming apparatus 1 specified by the received beacon and icons 202-204 of the image forming apparatuses 1 around the specified image forming apparatus 1.

The application displays a point P indicating the position of the user at a predetermined position corresponding to the image forming apparatus 1 specified by the received beacon. The icons 202-204 and the point P are included in the map information received from the server 3. The icons 202-204 and the point P may be objects. The application may receive the icons 202-204 and the position information of the point P from the server 3, and place the icons 202-204 and the point P on the map to generate the map screen 200.

Figure 4:
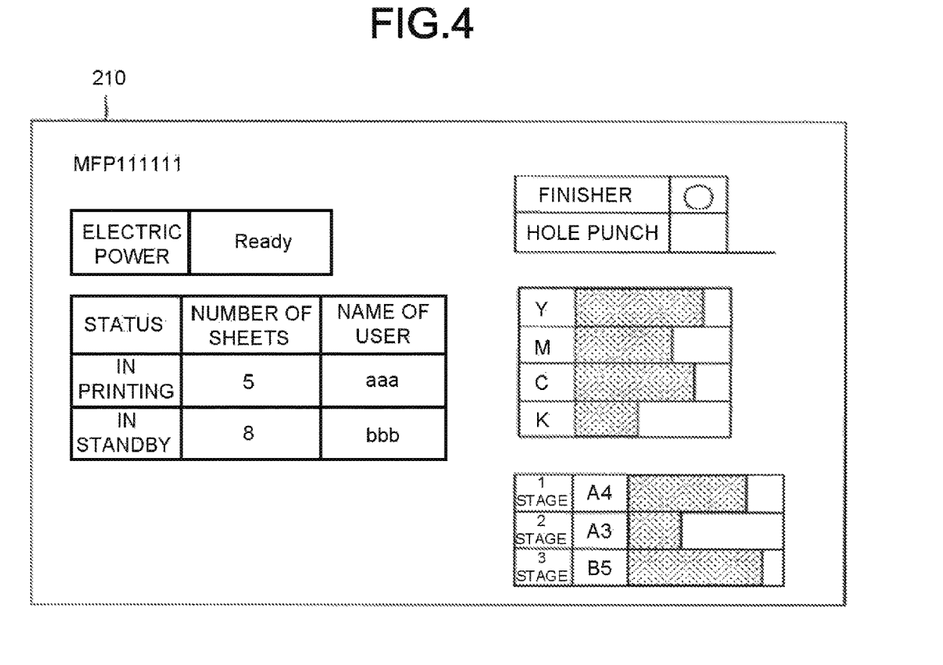
FIG. 4 is a diagram illustrating a status screen.

If receiving the selection of the icons 201-204 of the image forming apparatuses 1 from the user (Act 16), the application displays the status of the selected image forming apparatus 1 and a status screen 210 indicating the option item to be installed by the image forming apparatus 1 as shown in FIG. 4 (Act 17). The status screen 210 displays a status of a print job of each user, a status of electric power, a residual quantity of toner of Y-K and a residual quantity of sheets in each cassette from the first stage to the third stage of the image forming apparatus 1.

Figure 5:
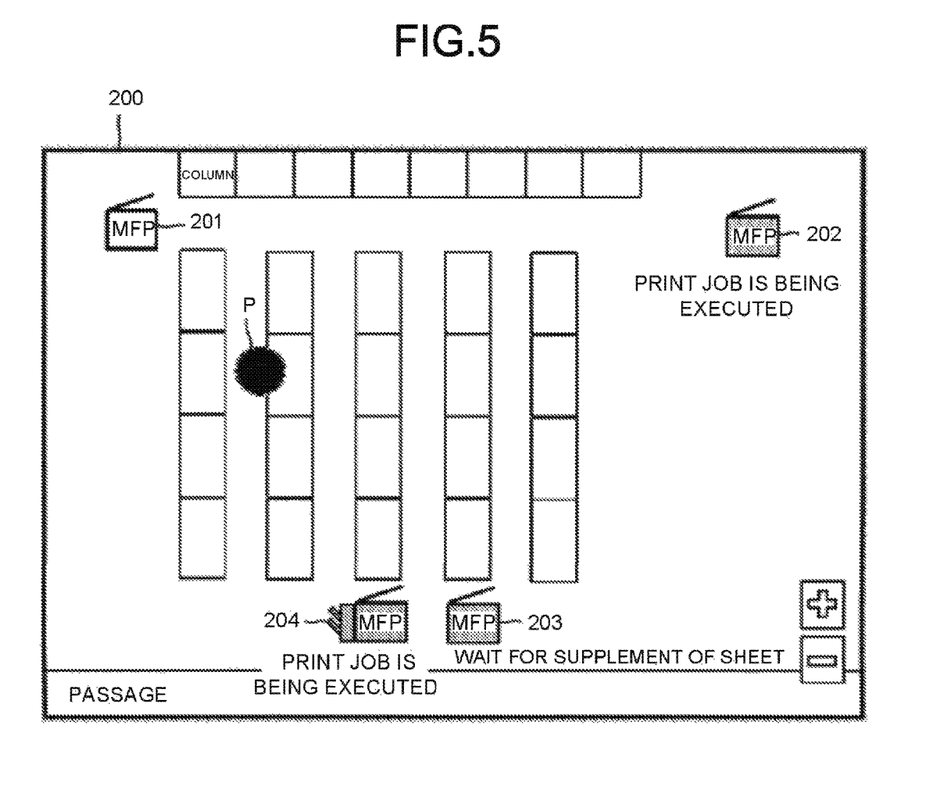
FIG. 5 is a diagram illustrating the map screen corresponding to a status of an image forming apparatus.

Furthermore, the application may display the icons 201-204 of the respective image forming apparatuses 1 corresponding to the statuses of the respective image forming apparatuses 1 at the time of displaying the map screen 200 in Act 214 as shown in FIG. 5. The icons 201-204 corresponding to the statuses of the image forming apparatuses 1 may be included in the map information. Further, the application may change the icons 201-204 as the objects according to the statuses.

The application may display the icon 201 of the image forming apparatus 1 which is in standby in white and display the icons 202 and 204 of the image forming apparatuses 1 which are executing the job in black. The application may display the icon 203 of the image forming apparatus 1 which is in the error status in black. The application may display the content of the error around the icon 203. In this way, the application can display the image forming apparatus 1 which can be immediately used in such a way as to be easily grasped by the user.

The application may display the icons 201-204 of the respective image forming apparatuses 1 corresponding to the option items to be installed by the respective image forming apparatuses 1. The icons 201-204 corresponding to the statuses of the image forming apparatuses 1 may be included in the map information. Further, the application may change the icons 201-204 as the objects according to the option items to be installed by the respective image forming apparatuses 1. The application may display the icon 204 of the image forming apparatus 1 having a finisher with a pattern indicating the image forming apparatus with the finisher.

In a case in which there is a print job corresponding to the identification information of the user in the server 3, the application may display the image forming apparatus 1 capable of executing the print job on the map screen 200. For example, in a case in which a print job needs the stapling function, the application may display the icon 204 of the image forming apparatus 1 having the finisher, for example, in a blinking manner in order to indicate that the print job of the user can be carried out. In this case, the server 3 may send the map screen 200 including an instruction for displaying the icon 204 in a blinking manner to the mobile terminal 4. Otherwise, the server 3 may send a message indicating that the job of the user is a print job that needs the stapling function to the mobile terminal 4. Then, the mobile terminal 4 may indicate that the image forming apparatus 1 having the stapling function is capable of carrying out the print job of the user. The server 3 may display only the icons 201-204 (for example, the icon 204) of the image forming apparatuses 1 capable of carrying out the print job of the user.

Further, after an image forming apparatus 1 is selected on the map screen 200 (Act 16), the application may receive the information of the status and the option item from the server 3 regarding the status and the option item of the selected image forming apparatus 1 (Act 17). Then, the application may display the status and the option item of the selected image forming apparatus 1 in the processing in Act 17.

If the mobile terminal 4 receives beacons from the plurality of the image forming apparatuses 1 (Act 11), the application sends the identification information of each of the image forming apparatuses 1 to the server 3 (Act 12 and Act 13). The server 3 sends the map information including all the image forming apparatuses 1 specified by the identification information included in the respective beacons to the mobile terminal 4. The application displays the map screen 200 in such away as to include all the image forming apparatuses 1 serving as respective transmission sources of the received beacons (Act 14 and Act 15).

Herein, the application determines a distance from the mobile terminal 4 to the image forming apparatus 1 in, for example, three stages according to intensity of the received beacon. The application sends each distance from the mobile terminal 4 to the image forming apparatus 1 to the server 3. The server 3 may calculate the position of the point P (position of the user) on the basis of each distance and send the map information including the position of the point P to the mobile terminal 4.

Further, the mobile terminal 4 may calculate the point P indicating the position of the user and display the point P on the basis of each distance from the mobile terminal 4 to the image forming apparatus 1. The mobile terminal 4 may notify the user of the closest image forming apparatus 1 on the basis of each distance. The mobile terminal 4 may display the icons 201-204 of the closest image forming apparatuses 1 by blinking the icons 201-204 or changing the color thereof so that it is understood that the image forming apparatuses 1 are the closest.

Figure 6:
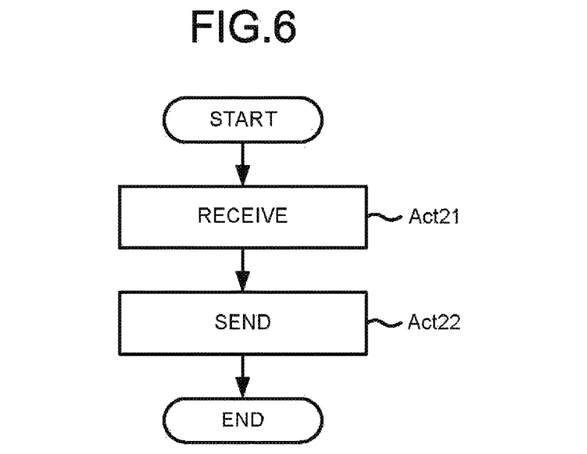
FIG. 6 is a flowchart illustrating a processing of a server.

FIG. 6 is a flowchart illustrating a processing of the server 3 at the time the user carries out the network printing.

The server 3 receives the identification information of the image forming apparatus 1 and the identification information of the user from the mobile terminal 4 (Act 21).

The server 3 sends the map information including the image forming apparatus 1 specified by the identification information and the image forming apparatuses 1 around the specified image forming apparatus 1 to the mobile terminal 4. Further, the server 3 sends the statuses and the option items of the image forming apparatus 1 specified by the identification information and each image forming apparatus 1 around the specified image forming apparatus 1 to the mobile terminal 4. (Act 22).

In the present embodiment, the user can easily browse the position and the status of the surrounding image forming apparatus 1 and the option item to be installed by the image forming apparatus 1 on the map screen 200 of the mobile terminal 4. In this way, the user can select a proper image forming apparatus 1 on the map screen 200.

Second Embodiment

Figure 7:
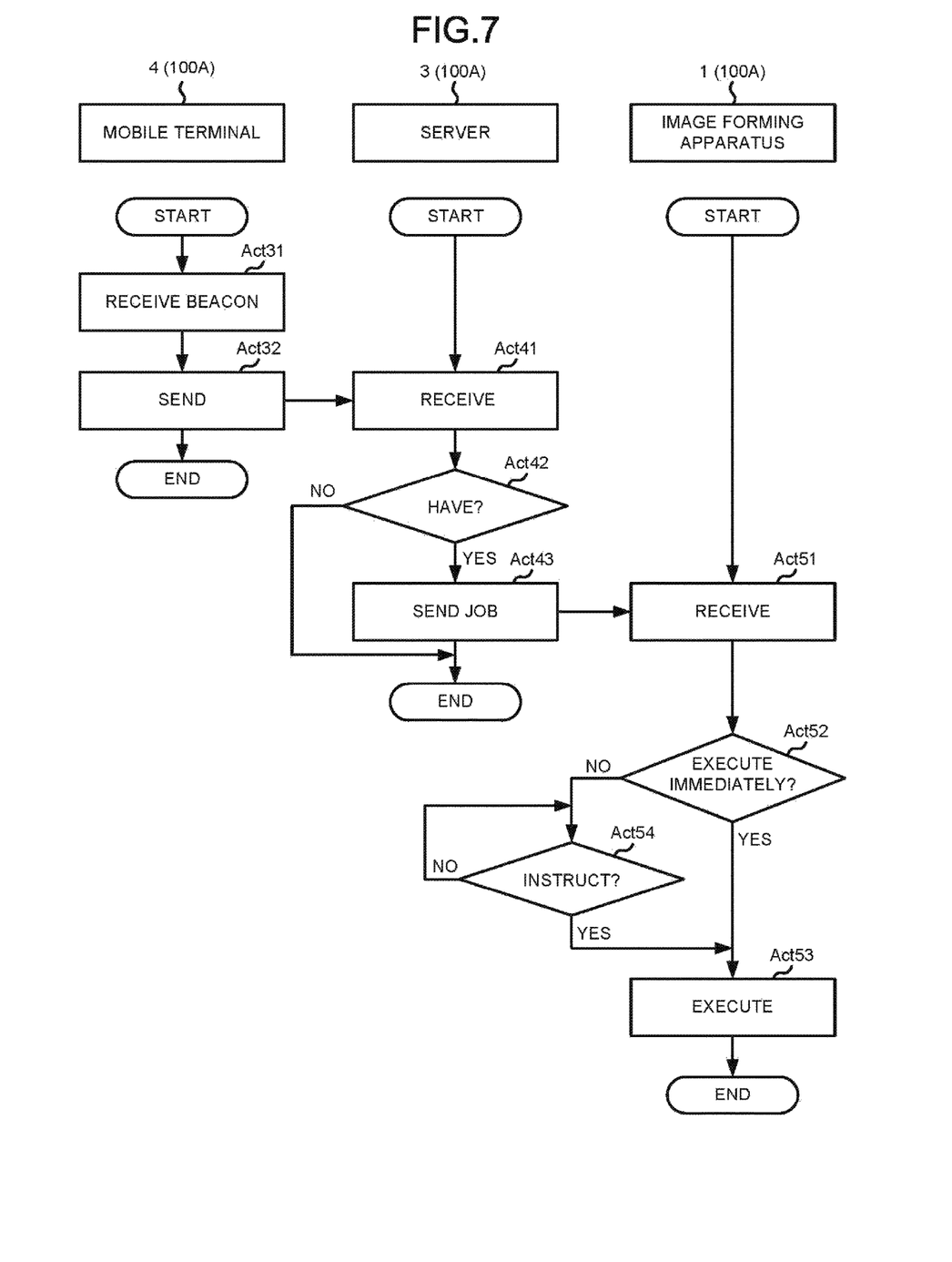
FIG. 7 is a flowchart illustrating a processing of the beacon utilization system.

Hereinafter, a processing of a beacon utilization system 100A at the time the user carries out the network printing is described with reference to a flowchart in FIG. 7.

The user sends the print job from the terminal device 2 to the server 3 in order to carry out the network printing. The user carries the mobile terminal 4 at a floor at which the image forming apparatus 1 is located in order to carry out the printing. The mobile terminal 4 carries out the authentication of the user to determine that the user is adaptable.

The mobile terminal 4 starts the application if receiving the beacon transmitted by the image forming apparatus 1 (Act 31). The application sends the identification information of the image forming apparatus 1 included in the received beacon and the identification information of the user to the server 3 (Act 32).

The server 3 receives the identification information of the image forming apparatus 1 and the identification information of the user from the mobile terminal 4 (Act 41).

The server 3 sends the print job of the user to the image forming apparatus 1 specified from the identification information received from the mobile terminal 4 (Act 43) if there is the print job of the user (YES in Act 42). The server 3 ends the processing if there is no print job of the user (NO in Act 42).

The image forming apparatus 1 receives the print job of the user from the server 3 (Act 51).

The image forming apparatus 1 can set whether the print job is executed immediately or after receiving an instruction of the user in a case of receiving the print job for network printing using the beacon.

The image forming apparatus 1 executes the print job without the operation of the operation section 14 by the user (Act 53) if it is set that the print job is executed immediately (YES in Act 52).

The image forming apparatus 1 executes the print job (Act 53) after receiving the instruction from the user through the operation section 14 (YES in Act 54) if it is set that the print job is executed after receiving the instruction of the user (NO in Act 52).

In the present embodiment, at the time the user arrives at the image forming apparatus 1, since the image forming apparatus 1 is in a state of already executing the print job or already storing the print job of the user, time until the completion of the execution of the print job can be shortened.

Furthermore, even in the present embodiment, the application of the mobile terminal 4 may receive the map information from the server 3 if receiving the beacon transmitted by the image forming apparatus 1. Then, the application may display the map screen 200 for displaying the status of the image forming apparatus 1 which is a map screen indicating the position of the image forming apparatus 1 on the basis of the map information.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A beacon utilization system comprising:
a plurality of image forming apparatuses
a server; and
a mobile terminal,
wherein
each of the plurality of image forming apparatuses wirelessly transmits a beacon comprising identification information that specifies itself, and sends the identification information and a status to the server,
the server receives the identification information and the status sent by each of the plurality of image forming apparatuses, stores the status in association with the identification information, receives the identification information identifying an image forming apparatus, of the plurality of image forming apparatuses, from the mobile terminal, and in response to receipt of the identification information from the mobile terminal, sends map information for displaying the image forming apparatus and the status specified by the identification information to the mobile terminal, and
in response to receipt of the beacon by the mobile terminal, the mobile device sends the identification information identifying the image forming device to the server, receives the map information and the status from the server, and displays a map screen for displaying the status of the image forming apparatus, wherein the map screen indicates a position of the image forming apparatus based on the map information.

2. The beacon utilization system according to claim 1, wherein
the mobile terminal displays an icon of the image forming apparatus on the map screen based on the status.

3. The beacon utilization system according to claim 1, wherein
the image forming apparatus regularly notifies the server of the identification information and the status, and the status is at least one of a status of a job, a status of electric power, presence/absence of an error status, a residual quantity of toner, or a residual quantity of papers.

4. The beacon utilization system according to claim 1, wherein the identification information comprises a media access address.

5. A network comprising the beacon utilization system according to claim 1 and a plurality of personal computers.

6. A beacon utilization system comprising:
a plurality of image forming apparatuses;
a server; and
a mobile terminal,
wherein
each image forming apparatus wirelessly transmits a beacon comprising first identification information that specifies itself and sends the first identification information and a status to the server,
the mobile terminal receives the beacon and sends the first information and second identification information identifying a user to a server, and
the server stores job information specifying a job associated with the user, receives the first identification information and the status sent from an image forming apparatus of the plurality of image forming apparatuses, stores the status in association with the first identification information, receives the first identification information and the second identification information from the mobile terminal, and in response to receiving the first identification information and the second identification information from the mobile terminal, sends the job information associated with the user specified by the second identification information to the image forming apparatus specified by the first identification information.

7. The beacon utilization system according to claim 6, wherein the mobile terminal displays an icon of the image forming apparatus on the map screen based on the status.

8. The beacon utilization system according to claim 6, wherein
each of the plurality of image forming apparatuses regularly notifies the server of the first identification information and the status, and the status is at least one of a status of a job, a status of electric power, presence/absence of an error status, a residual quantity of toner, and a residual quantity of papers.

9. The beacon utilization system according to claim 6, wherein the first identification information comprises a media access address.

10. A network comprising the beacon utilization system according to claim 6 and a plurality of personal computers.

11. A method by a mobile terminal, comprising:
- receiving a beacon transmitted by an image forming apparatus of a plurality of image forming apparatuses defined in a server, wherein the beacon comprises identification information identifying the image forming apparatus, and wherein the server stores identification information and status information for each of the plurality of image forming apparatuses;
- in response to the receiving, sending the identification information of the image forming apparatus to the server;
- receiving map information from the server; and
- displaying a map screen that displays a status of the image forming apparatus and a position of the image forming apparatus based on the map information.

12. The method according to claim 11, further comprising:
- displaying, by the mobile terminal, an icon of the image forming apparatus on the map screen based on the status.

13. The method according to claim 11, further comprising sending a print job to the server.

14. The method according to claim 11, further comprising:
- receiving the status of the image forming apparatus from the server, wherein the status is at least one of a status of a job, a status of electric power, presence/absence of an error status, a residual quality of toner, and a residual quantity of papers from the server.

15. The method according to claim 11, wherein the identification information comprises a media access address.

16. A beacon utilization method by a system comprising a plurality of image forming apparatuses, a server and a mobile terminal, comprising:
- wirelessly transmitting, by an image forming apparatus of the plurality of image forming apparatuses, a beacon comprising identification information that identifies the image forming apparatus;
- sending, by the image forming apparatus, a status of the image forming apparatus to the server;
- receiving the beacon at the mobile terminal;
- in response to receipt of the beacon at the mobile terminal, sending, by the mobile terminal, the identification information identifying the image forming apparatus to the server, wherein the server stores identification for each of the plurality of image forming apparatuses in association with statuses of each of the plurality of image forming apparatuses;
- receiving, by the server, the identification information identifying the image forming apparatus from the mobile terminal;
- in response to the receiving the identification information, sending, by the server, map information for displaying the image forming apparatus specified by the identification information to the mobile terminal;
- receiving, by the mobile terminal, the map information and the status from the server; and
- displaying, by the mobile terminal, a map screen that renders the status of the image forming apparatus and indicates a position of the image forming apparatus based on the map information.

17. The beacon utilization method according to claim 16, further comprising:
- displaying, on the mobile terminal, an icon of the image forming apparatus on the map screen on the basis of the status.

18. The beacon utilization method according to claim 16, further comprising:
- regularly notifying the server, by the image forming apparatus, of the identification information and the status, wherein the status is at least one of a status of a job, a status of electric power, presence/absence of an error status, a residual quantity of toner, or a residual quantity of papers.

19. The beacon utilization method according to claim 16 further comprising:
- sending, by the mobile terminal, a print job to the server; and
- receiving, by the image forming apparatus, the print job from the server.

20. The beacon utilization method according to claim 16, wherein the identification information comprises a media access address.

* * * * *